(12) United States Patent
Jennings

(10) Patent No.: US 7,416,254 B2
(45) Date of Patent: Aug. 26, 2008

(54) DEVICE TO INDICATE WHEN A MOVABLE BACKREST OF A VEHICLE SEAT IS IN AN UNLOCKED POSITION

(75) Inventor: Austin Jennings, Lindhorst (DE)

(73) Assignee: Faurecia Autositze GmbH & Co. KG, Stadthagen (DE)

( * ) Notice: Subject to any disclaimer, the term of this patent is extended or adjusted under 35 U.S.C. 154(b) by 212 days.

(21) Appl. No.: 11/230,925

(22) Filed: Sep. 21, 2005

(65) Prior Publication Data

US 2006/0061184 A1     Mar. 23, 2006

(30) Foreign Application Priority Data

Sep. 22, 2004    (DE)   ................. 10 2004 045 988

(51) Int. Cl.
*B60N 2/48*     (2006.01)
(52) U.S. Cl. ............................. 297/348.12; 297/378.13
(58) Field of Classification Search ............ 297/378.12, 297/378.13
See application file for complete search history.

(56) References Cited

U.S. PATENT DOCUMENTS

| | | | | |
|---|---|---|---|---|
| 4,067,611 | A | * | 1/1978 | Kurozu et al. ............ 297/378.13 |
| 4,206,946 | A | * | 6/1980 | Maertens ............ 297/378.12 X |
| 4,636,005 | A | * | 1/1987 | Bolz et al. ............. 297/378.13 |
| 4,684,175 | A | * | 8/1987 | Trutter ................... 297/378.13 |
| 4,779,927 | A | * | 10/1988 | Trutter et al. .......... 297/378.13 |
| 5,328,243 | A | * | 7/1994 | Akiyama .............. 297/378.12 |
| 5,562,325 | A | * | 10/1996 | Moberg ................. 297/378.13 |
| 5,664,839 | A | * | 9/1997 | Pedronno et al. ....... 297/378.13 |
| 5,716,100 | A | * | 2/1998 | Lang ...................... 297/378.12 |
| 5,762,401 | A | * | 6/1998 | Bernard ................. 297/378.13 |
| 5,829,831 | A | * | 11/1998 | Sharman ................ 297/378.12 |
| 5,855,414 | A | * | 1/1999 | Daniel et al. ........... 297/378.13 |

(Continued)

FOREIGN PATENT DOCUMENTS

DE      90 11 485.8      11/1990

(Continued)

OTHER PUBLICATIONS

German Office Action dated Mar. 10, 2005 in German Application No. 10 2004 045 988.6-42, filed, Sep. 22, 2004 (3 pages).

(Continued)

*Primary Examiner*—Rodney B. White
(74) *Attorney, Agent, or Firm*—Shlesinger, Arkwright & Garvey LLP

(57) ABSTRACT

Signaling device indicates when a folding backrest of a vehicle seat is in an unlocked position, and includes an actuating knob axially guided in a housing and which is pushed into its locked position by a compression spring. A stop is provided to prevent the actuating knob from extending further outwardly of the housing in its locked position. Actuating knob activates a locking mechanism via a mechanical transmission mechanism thereby allowing the backrest to be unlocked by pressing the actuating knob into the housing. This eliminates the need for a separate indicator device, given that when the actuating knob extends outwardly of the housing, the user can readily tell that the backrest is in its unlocked position. To enhance the signaling effect, the signaling portion of the actuating knob can be painted red, for example.

10 Claims, 9 Drawing Sheets

U.S. PATENT DOCUMENTS

| | | | |
|---|---|---|---|
| 5,997,090 A | | 12/1999 | Baloche et al. |
| 6,139,076 A | * | 10/2000 | Hara et al. ............... 292/336.3 |
| 6,164,723 A | * | 12/2000 | Ganot ................... 297/378.12 |
| 6,260,924 B1 | | 7/2001 | Jones et al. |
| 6,302,484 B1 | * | 10/2001 | Araki et al. ............ 297/378.12 |
| 6,705,679 B1 | * | 3/2004 | Zelmanov et al. ...... 297/378.13 |
| 6,733,078 B1 | * | 5/2004 | Zelmanov ........... 297/378.13 X |
| 6,769,741 B2 | * | 8/2004 | Denning ................ 297/378.13 |
| 6,786,551 B2 | * | 9/2004 | Brewer et al. .......... 297/378.12 |
| 7,152,923 B2 | * | 12/2006 | Charras et al. ......... 297/378.12 |
| 7,152,924 B1 | * | 12/2006 | Nemoto et al. ......... 297/378.12 |
| 7,156,461 B2 | * | 1/2007 | Bolte et al. ......... 297/378.13 X |
| 7,226,129 B2 | * | 6/2007 | Brandes et al. ......... 297/378.12 |
| 2005/0023877 A1 | * | 2/2005 | Vermeulen ............. 297/378.13 |
| 2005/0194826 A1 | * | 9/2005 | O'Callaghan et al. .. 297/378.13 |
| 2006/0170270 A1 | * | 8/2006 | Inoue et al. ............ 297/378.12 |

FOREIGN PATENT DOCUMENTS

| | | |
|---|---|---|
| DE | 42 01 829 A1 | 6/1993 |
| DE | 196 00 789 C2 | 6/1993 |
| DE | 42 16 584 C2 | 11/1993 |
| DE | 44 00 911 A1 | 8/1994 |
| DE | 44 44 122 C1 | 4/1996 |
| DE | 196 35 740 A1 | 3/1997 |
| DE | 297 07 562 U1 | 10/1997 |
| DE | 197 24 554 A1 | 12/1998 |
| DE | 197 13 753 C2 | 2/2000 |
| DE | 198 82 413 T1 | 5/2000 |
| DE | 698 00 455 T2 | 6/2001 |
| DE | 100 26 530 A1 | 12/2001 |
| DE | 101 42 981 A1 | 3/2003 |
| DE | 101 60 929 A1 | 7/2003 |
| DE | 102 30 637 A1 | 1/2004 |
| DE | 102 40 042 A1 | 3/2004 |
| DE | 103 01 283 B3 | 7/2004 |
| DE | 103 15 375 A1 | 11/2004 |
| EP | 0 901 934 A1 | 3/1999 |
| EP | 1 046 541 A1 | 10/2000 |
| JP | 10147166 A | 6/1998 |
| JP | 2001097099 | 4/2001 |
| WO | 99/38723 | 8/1999 |
| WO | 01/89875 A1 | 11/2001 |

OTHER PUBLICATIONS

German Office Action dated Oct. 24, 2005 in German Application No. 10 2005 003 819.0-16, filed Jan. 27, 2005 (2 pages).

German Office Action dated Mar. 10, 2005 in German Application No. 10 2004 045 988.6-42, filed, Sep. 22, 2004 (3 pages).

German Office Action dated Dec. 6, 2005 in German Application No. 10 2005 005 485.4, filed Feb. 4, 2005 (3 pages).

* cited by examiner

DEVICE TO INDICATE WHEN A MOVABLE BACKREST OF A VEHICLE SEAT IS IN AN UNLOCKED POSITION

CROSS-REFERENCE TO RELATED APPLICATIONS

This application claims priority of German Application No. 10 2004 045 988.6, filed Sep. 22, 2004, and which is incorporated herein by reference.

FIELD OF THE INVENTION

The invention relates to a device to indicate when a movable or folding backrest of a vehicle seat is not in a locked position. More particularly, the invention relates to a device to indicate when a folding backrest of a vehicle seat is in an unlocked position.

BACKGROUND OF THE INVENTION

Passenger cars with folding seats have represented the state of the art for many years. In several models the backrest is divided into sections so that certain segments or the entire backrest may be folded down. The arresting and securing of the backrest and/or portions thereof is facilitated by a locking mechanism, which can be released by use of an actuating knob connected to mechanical transmission means such as a cable, rod or lever. The backrest or a portion thereof can be folded forward and down to expand cargo area. The backrest can then be folded back to return the seat to passenger use. When returning the seat to passenger use, it can occur that the backrest does not engage the locking mechanism completely or at all, even though the user may be convinced upon visual examination that the backrest is properly locked. Only by pulling on the backrest can it be determined with absolute certainty whether the backrest is in a properly locked position. However, for reasons of convenience this test is frequently not performed. A backrest that is not properly locked, however, can become a fatal hazard for passengers, since a rear-end collision or heavy breaking can cause objects stored in the cargo space to enter into the passenger cabin like projectiles.

To prevent this from occurring, indicator devices have been developed that signal to the driver that the backrest of a backseat is not locked or not locked properly.

DE 102 30 637 A1 describes such a display device. The device includes an illuminating device, which signals through illumination whenever a backrest is not locked. In addition to the signal device, an actuating element of the display indicating an unlocked backrest is also provided. In locked position, the upper end of the actuating element is flush with a frame provided on the upper face of the backrest. To unlock the backrest, the actuating element is pulled upward. In this state, the actuating element projects above the upper face of the backrest and remains in this position when the backrest is unlocked.

A display of the same type for indicating that a vehicle seat backrest is not in locked position is described in JP 2001097009-A. In this commonly known solution, a separate indicator for signaling that the backrest is not in locked position is provided in addition to the actuation knob.

OBJECTS AND SUMMARY OF THE INVENTION

An object of the invention is to eliminate the need for such separate indicator devices.

This object is achieved with an indicator for signaling that the vehicle seat backrest is not in a locked position in accordance with the teachings of the invention, as described below.

The inventive indicator signals when a vehicle seat backrest is not in a locked position; i.e., when the movable backrest of the vehicle seat is in an unlocked position. The indicator includes a housing, and an actuating knob guided axially in the housing. The actuating knob is pushed into its locked position by a compression spring, and a stop is provided and configured to prevent the actuating knob from extending further than a predetermined amount out of the housing. The actuating knob is configured to activate a locking mechanism via a transmission mechanism, thereby causing a backrest of a vehicle seat to be unlocked by pressing the actuating knob into the housing. The stop is displaced axially in the biasing direction of the compression spring during the unlocking process, so that the actuating knob is pressed by the compression spring against the displaced stop into its unlocked signaling position, in which the actuating knob, and hence an unlocked condition signaling portion of the actuating knob, projects substantially further out of the housing than the unlocked condition signaling portion does in the locked position of the actuating knob.

In accordance with the invention, an actuating knob, which when pressed down unlocks the backrest, functions at the same time as an indicator for signaling that the backrest is not in its locked position.

In accordance with the prior art, a known actuating knob was forwardly biased into its locked position by a compression spring, and a stop prevented the prior art actuating knob from being pressed beyond its locked position and out of its housing. The present invention teaches that a stop can be displaced during the inventive unlocking procedure, so that the compression spring can press the actuating knob against the displaced stop significantly further out of the housing than when it is in its locked position.

Advantageous embodiments of the invention are as described above and below.

Below the invention is described in further detail with reference to various embodiments.

Relative terms such as up, down, left, and right are for convenience and are not intended to be limiting.

The term movable is intended to include adjustable and folding, for example, in accordance with the invention.

DETAILED DESCRIPTION OF THE INVENTION

Figure 1:
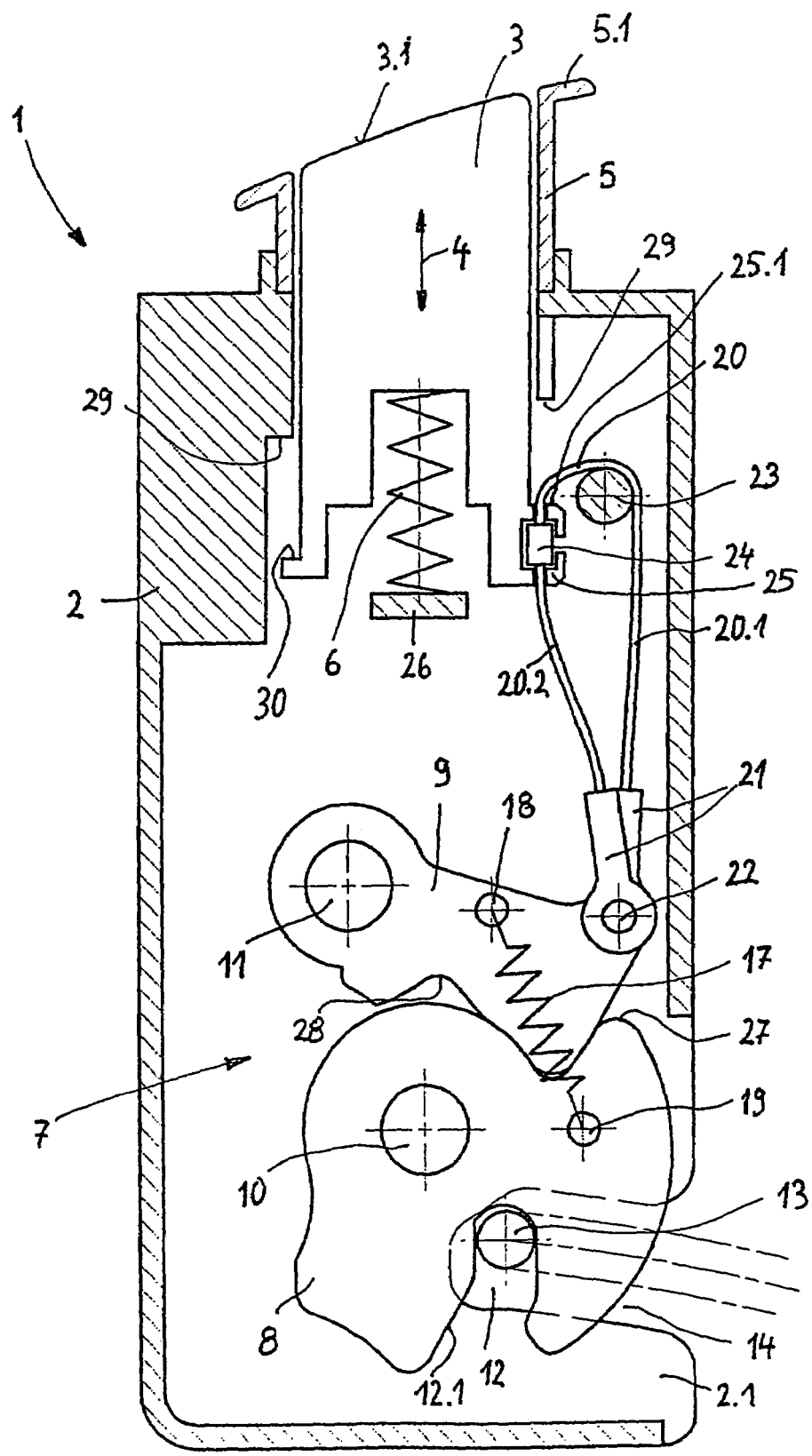
FIG. 1 illustrates a cross section through the housing of a locking mechanism for a folding backrest of a vehicle seat with an actuating knob set to locked position according to a first embodiment of the invention.

Before the individual embodiments are described in further detail, the features common to all embodiments of the invention will first be stated.

Actuating mechanism 1 for unlocking an unillustrated folding backrest of a vehicle seat is provided in a housing 2, which is secured to an upper portion of the bearing structure of the backrest. At the upper end of the housing 2 an actuating knob 3 is axially guided in the direction of double-ended arrow 4. Disposed on the housing 2 is a guard 5, which serves as an axial guide for the actuating knob 3, and whose flange region 5.1 is disposed on the cover of the backrest when the housing 2 is assembled. A compression spring 6 presses the actuating knob 3 into its locked position illustrated in FIGS. 1, 4 and 7, in which the upper edge 3.1 is flush with the flange region 5.1 of the guard 5.

The housing 2 also contains a locking mechanism 7. This includes a rotary latch 8 and a ratchet 9, which are each mounted in housing 2 pivotally about axes 10 and 11 mounted fixedly to the housing. In locked position (FIGS. 1, 4 and 7) a crook 12 provided on rotary latch 8 hooks over a lug 13 from above that is mounted fixedly on the chassis, which runs through a recess 14 in a side wall 2.1 of the housing 2. This locked position of the rotary latch 8 is secured by ratchet 9, the end of which facing away from the pivot axis provides a catch 15, which rests in a mating configured recess 16 of the rotary latch 8 shaped to fit it. The ratchet 9 and the rotary latch 8 are pulled toward one another by a tension spring 17, the ends of which are secured to attachment points 18, 19 on ratchet 9 and rotary latch 8, respectively. Pivoting the rotary latch 8 into its unlocked position (FIGS. 3, 6 and 9), in which the crook 12 releases the lug 13 secured fixedly to the chassis, is only possible if the ratchet 9 has first been pivoted counterclockwise. This pivoting is activated by pressing the actuating knob 3 into the housing, wherein the actuating knob 3 is connected to the ratchet 9 via transmission means. These transmission means vary from embodiment to embodiment and are specified below.

Figure 2:
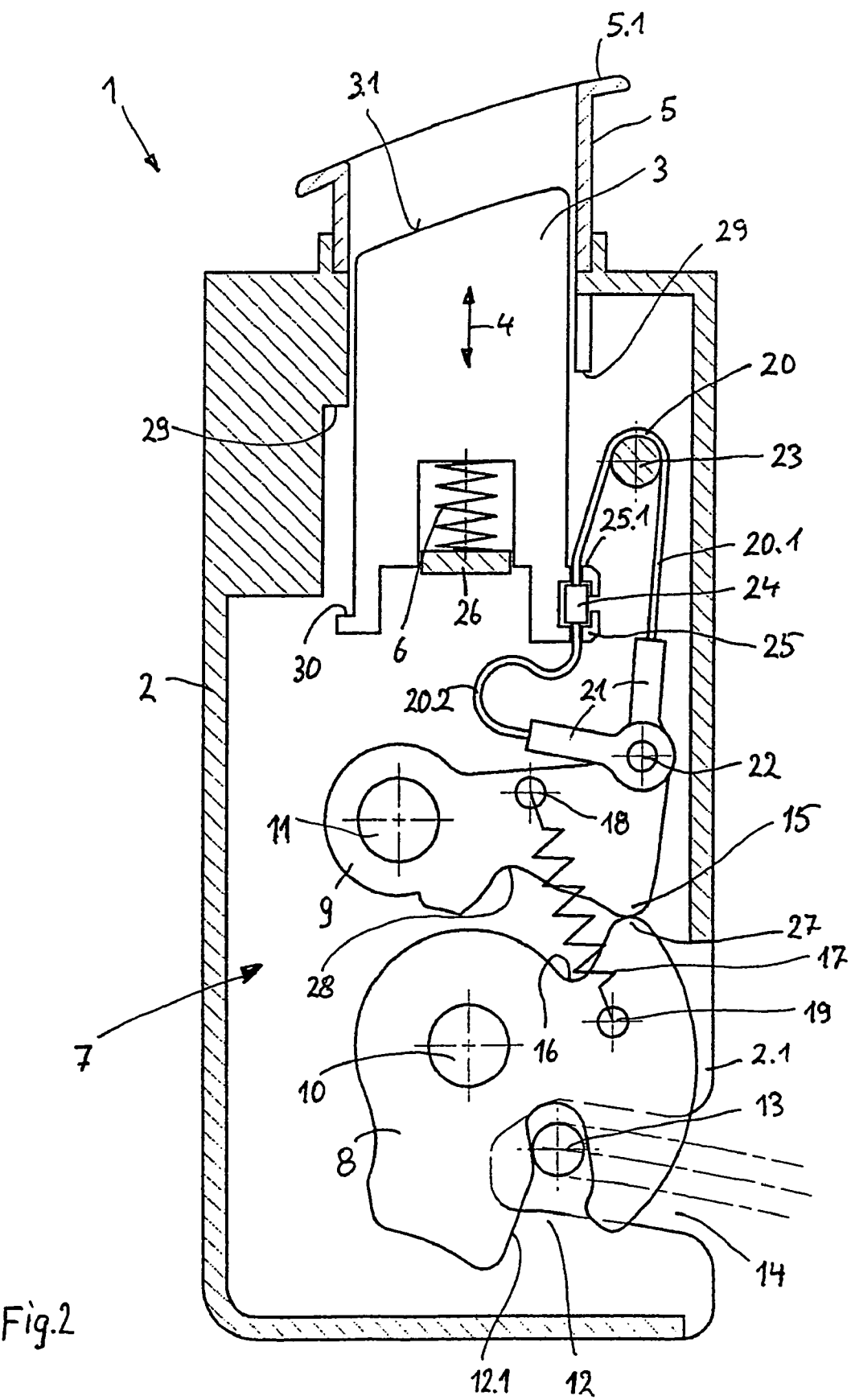
FIG. 2 illustrates an actuating knob in accordance with FIG. 1 pushed into unlocked position.
Figure 3:
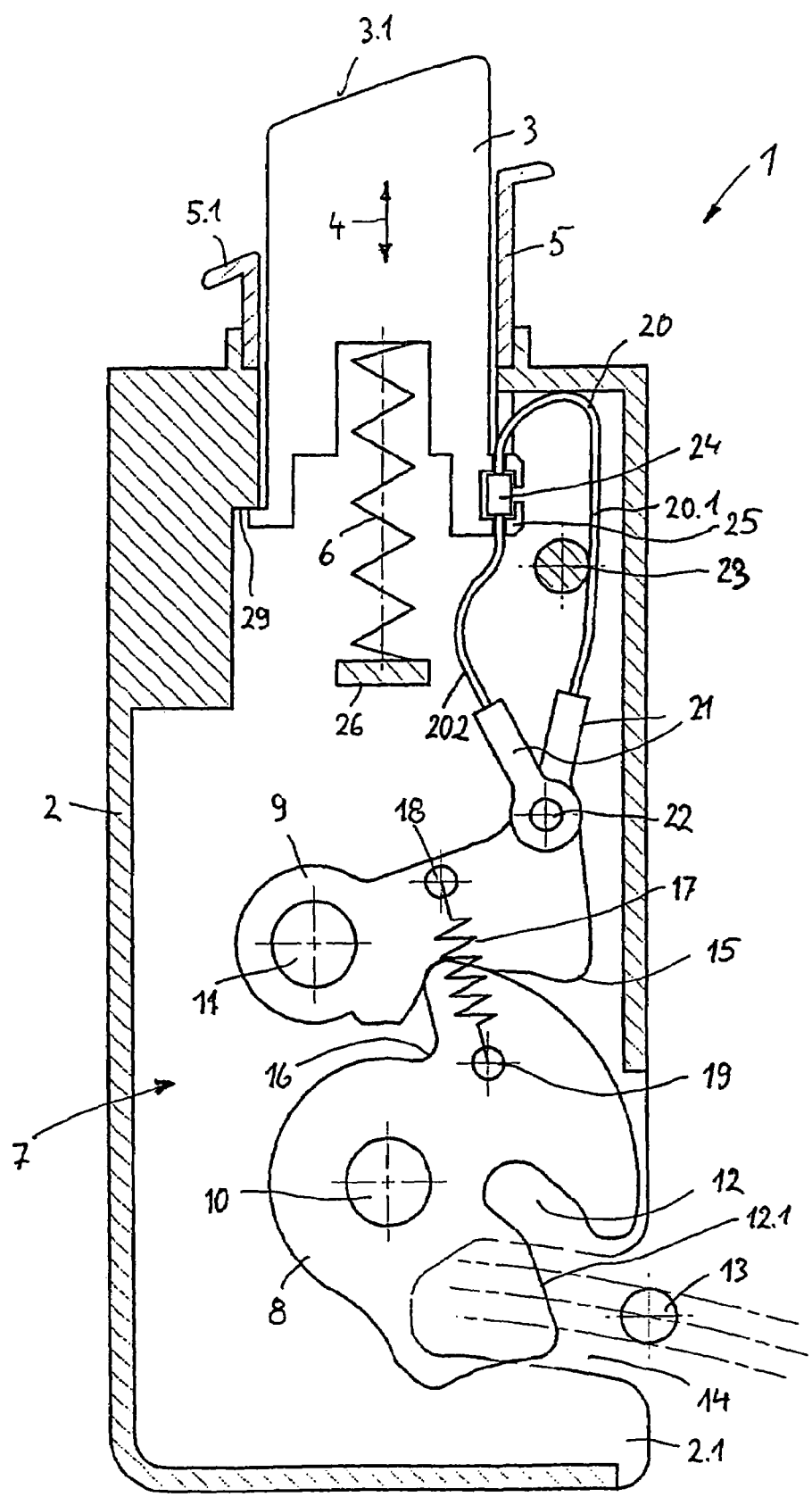
FIG. 3 illustrates an actuating knob in accordance with FIG. 1 in a signaling position.

In the embodiment illustrated in FIGS. 1 through 3, the transmission means includes a cable loop 20 to the end of which shoes 21 are clamped, which are pivotally attached to a stud 22 provided on the end opposite the pivot axis 11 of the ratchet 9. The cable loop 20 is routed around an anchoring stud 23 mounted fixedly in the housing, forming a branch 20.1 and another branch 20.2.

Attached fixedly on the branch 20.2 is a boss 24, which is hung in a chamber 25 as in a Bowden cable, wherein the chamber 25 is situated on the lower end of the actuating knob 3. In locked position both cable branches 20.1 and 20.2 are taut so that the boss 24 suspended in the chamber 25 serves as a stop for the actuating knob 3. One end of the compression spring 6 makes contact with a ledge 26 mounted fixedly in the housing and the other end makes contact with the lower surface of the actuation knob 3. Boss 24 prevents the actuating knob 3 from being pressed by the compression spring 6 any further out of the housing 2 than it is in locked position shown in FIG. 1, in which the upper surface 3.1 is flush with the flange 5.1 of the guard 5.

To unlock the backrest the actuating knob 3 must be pressed into the housing 2 against the force of the compression spring 6 as shown in FIG. 2. The boss 24 is pulled along by this pressing movement; that is, force is exerted on branch 20.1, in turn causing the ratchet 9 to pivot counterclockwise about the axis 11. As a result, the catch 15 of the ratchet emerges from the recess 16 of the rotary latch 8 and comes to rest on a catch 27 of the rotary latch 8, as FIG. 2 illustrates. From this point on it is no longer necessary to further press the actuating knob 3, since the tension spring 17 takes over the further opening of the rotary latch 8. The catch 27 of the rotary latch 8 then slips onto the lower surface of the ratchet 9 as the ratchet 9 continues to pivot counterclockwise toward the turning axis 11 and to fall into a recess 28 of the ratchet, whereby the unlocked position of the rotary latch 8 is fixed. The pivoting of the rotary latch 8 out of the locked position and into the unlocked position causes the lug 13 to become released from the crook 12 of the rotary latch 8, allowing the backrest to be folded forward.

By pivoting the ratchet 9 during the unlocking procedure, the stud 22 and thereby the cable loop 20 along with the boss 24 are displaced further upward in the direction of the compression spring 6 force from their locked state (FIG. 1). The compression spring 6 can thereby press the actuating knob 6 no longer held into position by boss 24 into its signaling position, in which it projects significantly further from the housing 2 and guard 5, respectively, than it does in its locked position. At least a portion of the outwardly extending region of the knob 3 may be termed an unlocked signaling portion. To enhance the signaling effect, it is advantageous if the actuating knob 3, except for the upper surface 3.1, is colored red. To prevent the spring 6 from pushing the actuating knob 3 completely out of housing 2, stops 29 secured to the housing are provided. In signaling position, a bottom flange 30 of actuating knob 3 makes contact with one of the stops, while an upper edge 25.1 of housing 25 of boss 24 makes contact with the other stop.

When the backrest is moved or folded back to its upright position, the lug 13 mounted fixedly to the chassis strikes the contact surface 12.1 of the crook 12 of the rotary latch 8. As a result, this pivots clockwise, whereby its catch 27 runs along the lower surface of the ratchet 9 until the catch 15 of the ratchet 9 falls back into recess 16 of rotary latch 8, whereby the locked state as illustrated in FIG. 1 is achieved. As long as the backrest is not locked and lug 13 mounted fixedly to the chassis is thereby not engaged by the crook 12 of the rotary latch 8, the actuating knob 3 projects from the guard 5, signaling that the backrest is not properly locked.

Figure 4:
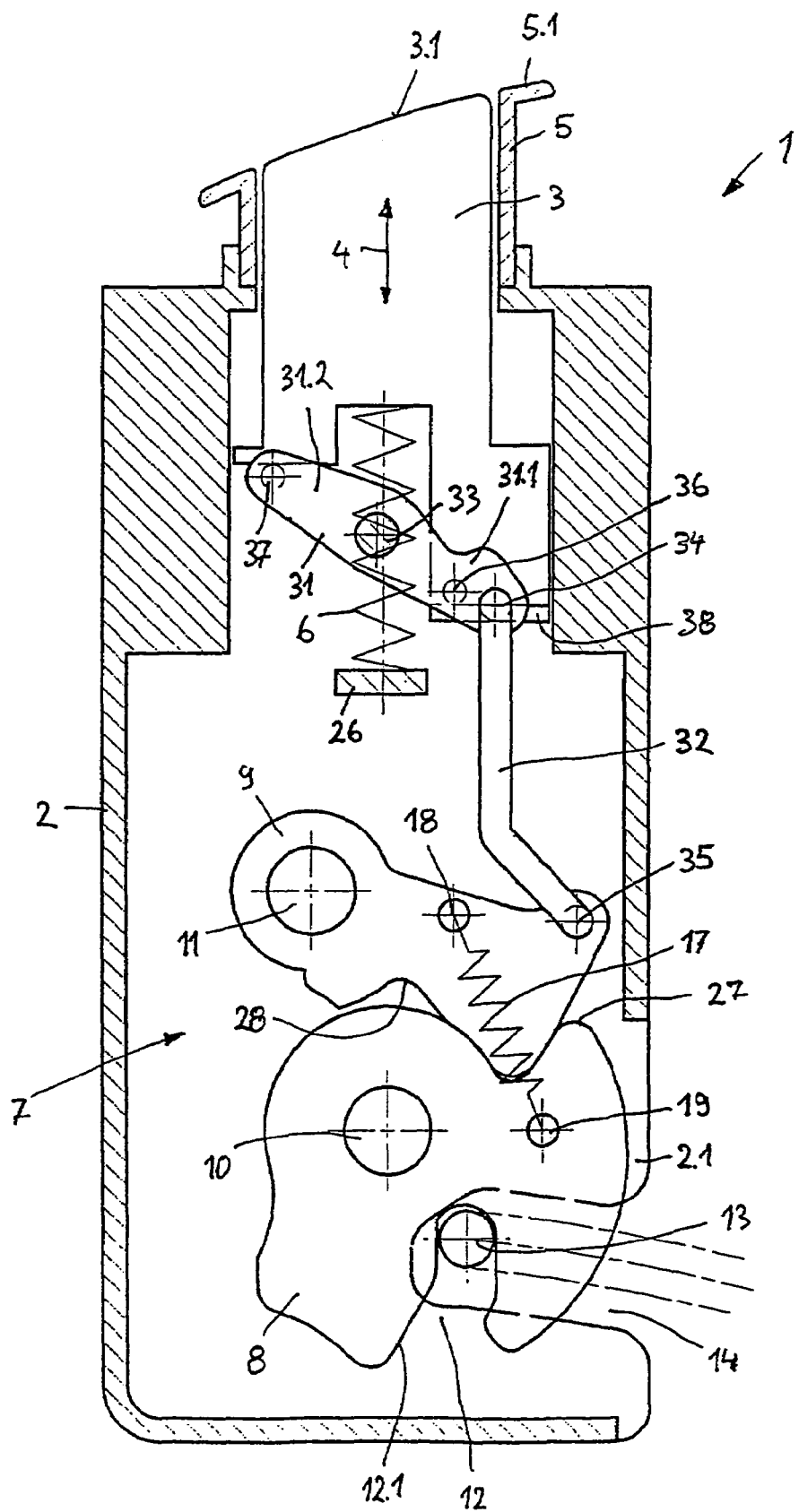
FIG. 4 illustrates a cross section through the housing of a locking mechanism for a folding backrest of a vehicle seat with an actuating knob set to locked position according to a second embodiment of the invention.
Figure 5:
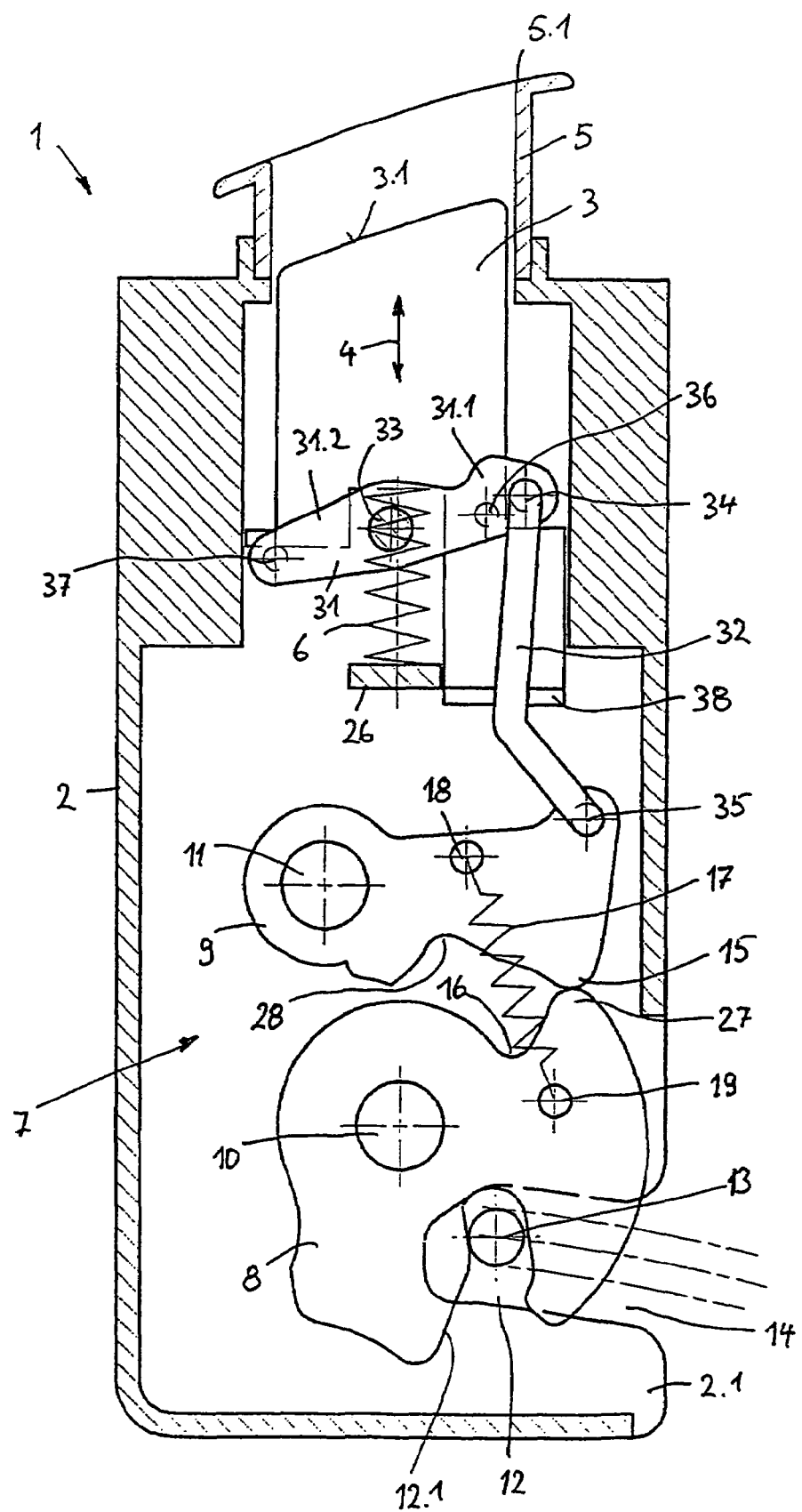
FIG. 5 illustrates an actuating knob in accordance with FIG. 4 in unlocked position.
Figure 6:
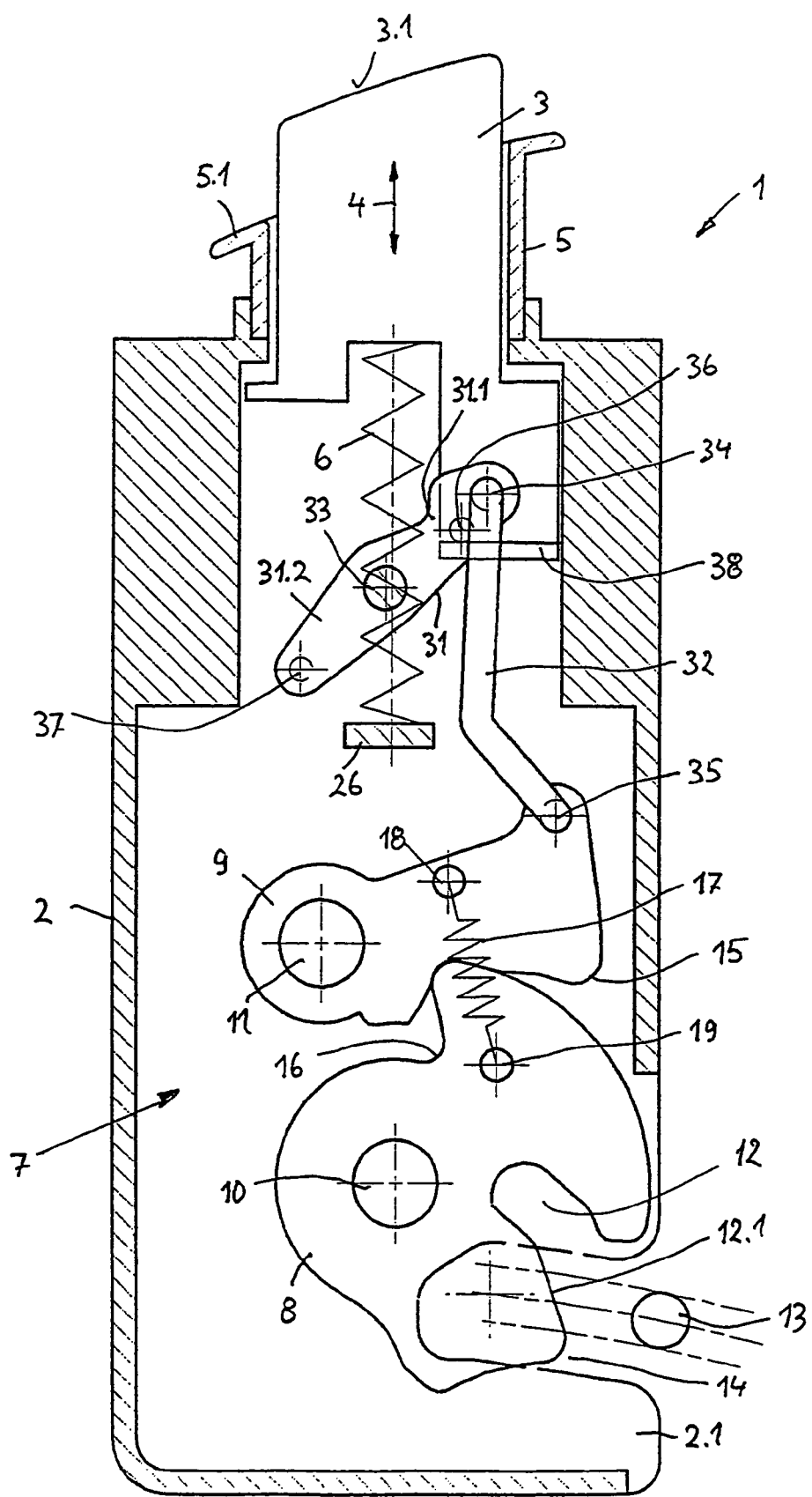
FIG. 6 illustrates an actuating knob in accordance with FIG. 4 in signaling position.

In the embodiment illustrated in FIGS. 4 through 6 the transmission means includes a rocker 31 and a transmission lever 32. The rocker 31 is pivotally mounted on an axis 33 fixedly mounted in the housing. At the end of one rocker arm 31.1 the end of the transmission lever 32 is connected at a pivot point 34 by a swivel joint. The other end of the transmission lever 32 is connected to the end of the ratchet 9 opposite the axis 11 at a pivot point 35 by a swivel joint.

At the ends of arms 31.1 and 31.2 of rocker 31 are a stop 36 and a stop or actuating stop 37, respectively. When the actuating knob 3 is in locked position, stop 37 makes contact with the lower surface of the actuating knob 3, while stop 36 abuts an extension 38 of the actuating knob 3 above.

To release locking mechanism 7, the actuating knob 3 is pressed downward into the housing 2 against the force of the compression spring 6 as FIG. 5 illustrates. Owing to the downward pressing movement of the actuating knob 3, the rocker 31 is pivoted counterclockwise via the stop 37 provided at the lower surface of the actuating knob 3. As a result of this pivoting motion, the stop 36 provided on the other arm 31.1 of the rocker 31 is displaced upward, while tension is exerted on the transmission lever 32, which extends to ratchet 9, and causes it to pivot counterclockwise. The remaining steps of the unlocking procedure are substantially the same as those of the previous embodiment, to which the reader's attention is directed.

Through the unlocking procedure, stop 36 is displaced upward from its position in the locked setting (FIG. 4) in the biasing direction of compression spring 6. If the actuating knob 3 is released, it is then driven by the compression spring 6 against the stop 36 upward and out of the housing 2 into its signal position illustrated in FIG. 6.

When the backrest is returned to its upright position and is properly locked, the components automatically return to their initial state illustrated in FIG. 4.

Figure 7:
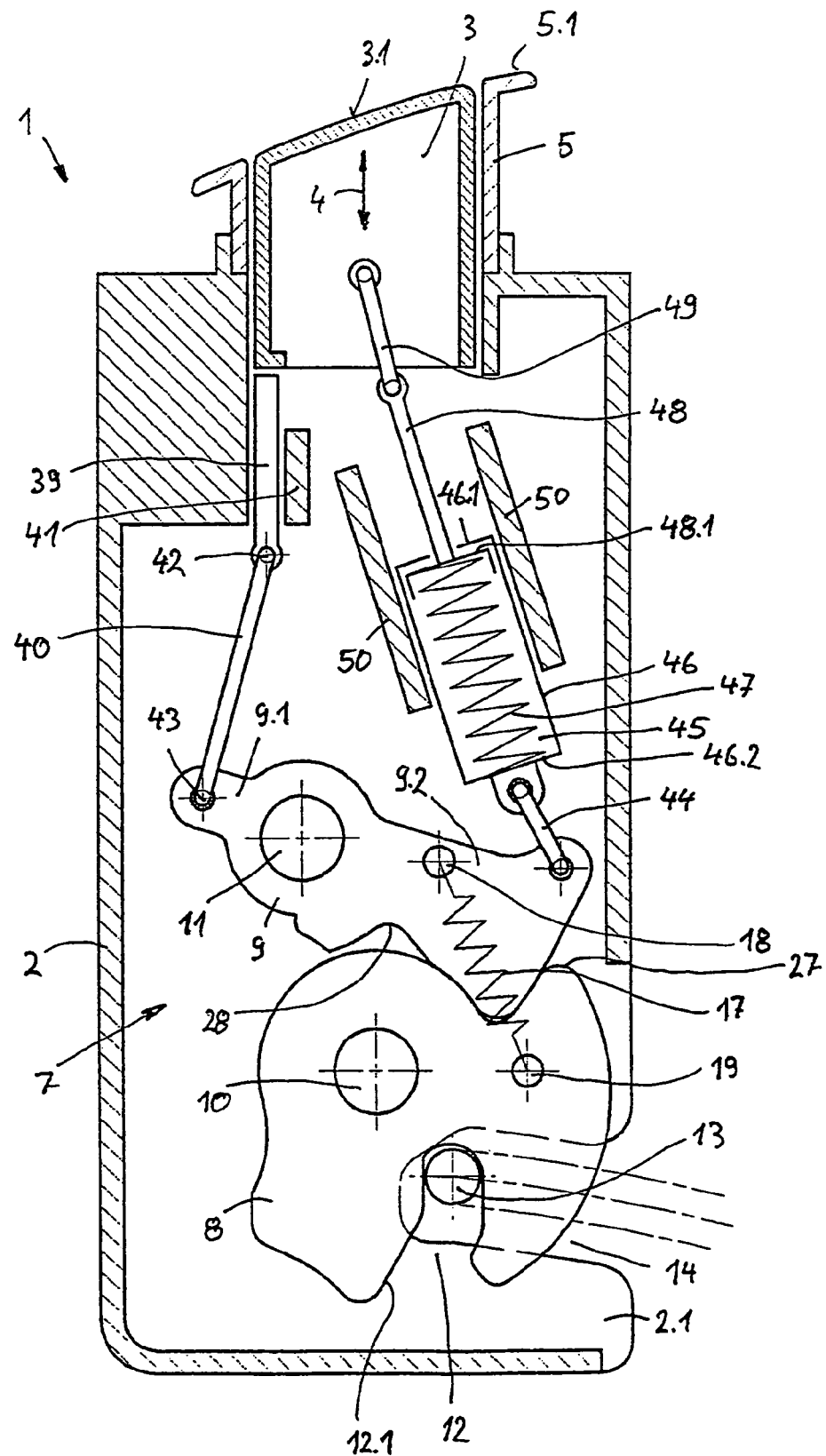
FIG. 7 illustrates a cross section through the housing of a locking mechanism for a folding backrest of a vehicle seat with an actuating knob set to locked position according to a third embodiment of the invention.
Figure 8:
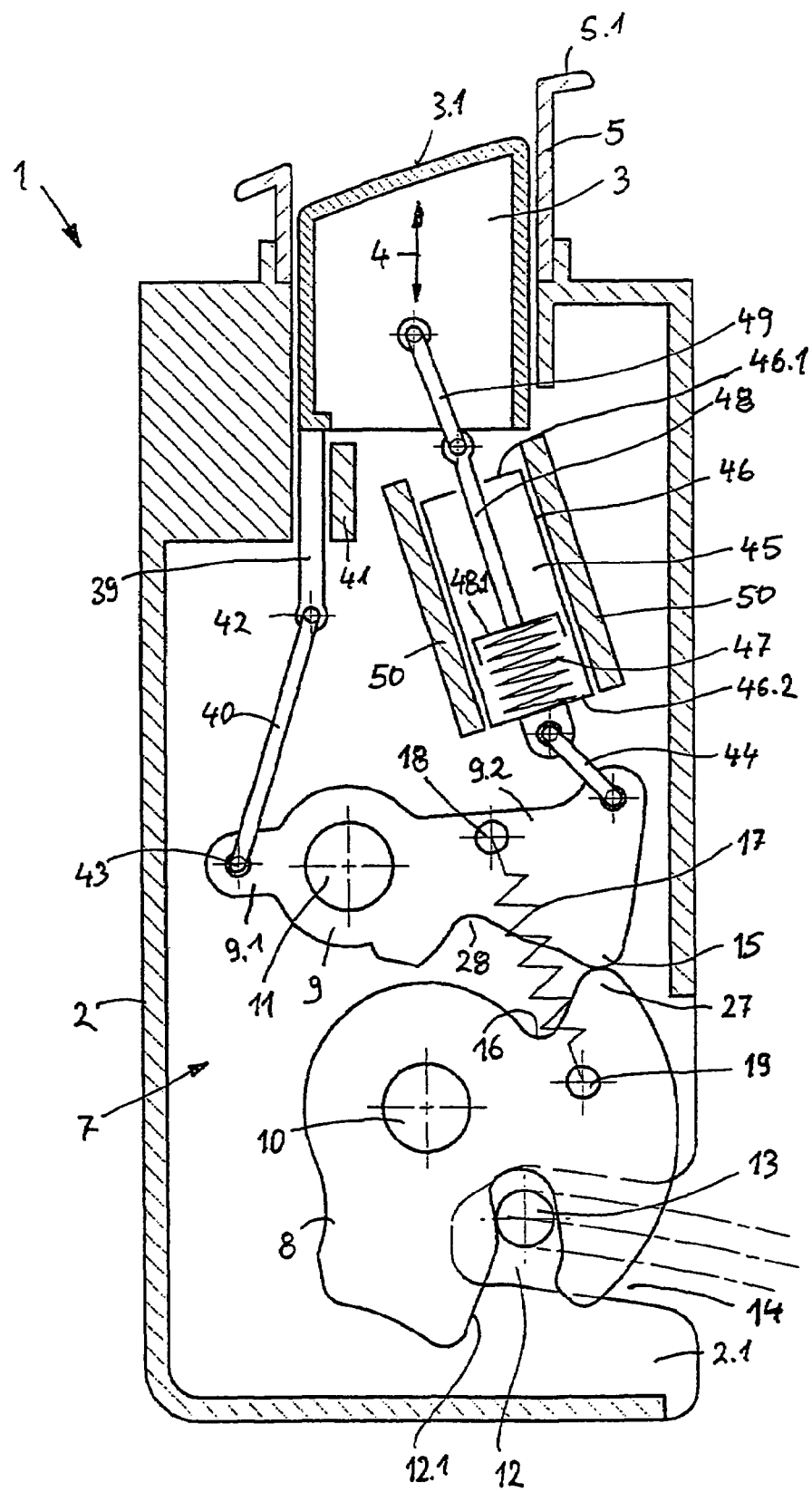
FIG. 8 illustrates an actuating knob in accordance with FIG. 7 in unlocking position.
Figure 9:
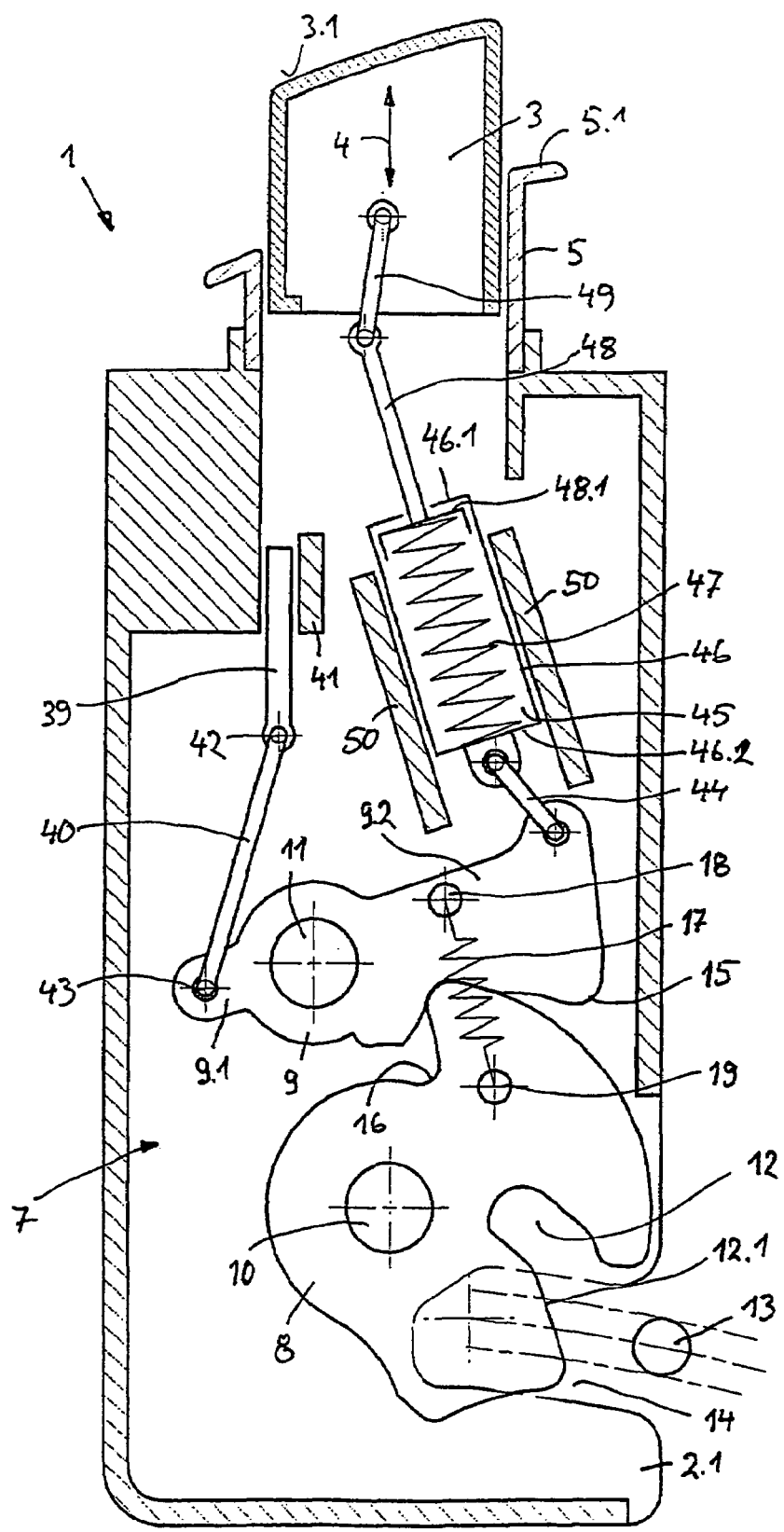
FIG. 9 illustrates an actuating knob in accordance with FIG. 7 in signaling position.

In the embodiment illustrated in FIGS. 7 through 9, the transmission means includes two transmission levers 39, 40. The transmission lever 39 is guided in an axial guide 41 of the housing 2 in the actuation direction of knob 3. When the actuating knob 3 is in locked position, the upper end of the transmission lever 39 is provided at the lower surface of the actuating knob 3 or is disposed slightly offset therefrom, as FIG. 7 illustrates. The other end of the transmission lever 39 is connected by use of a swivel joint to the end of the transmission lever 40 at a pivot point 42, while the other end of the transmission lever 40 is connected at pivot point 43 by a swivel joint to the end of a lever arm 9.1, which is connected to a two-armed ratchet 9 in this embodiment. The lever arm 9.1 extends diametrically to the lever arm 9.2 of the ratchet 9, on which a catch 15 is provided as in the previous embodiments.

A shock absorber or damper 45 is pivotally connected to the end of the lever arm 9.2 of the ratchet 9 via a coupling 44. This damper 45 includes as usual a housing 46 as well as a compression spring 47 and a piston rod 48 disposed therein. The end of the piston rod 48 is pivotally connected to the actuating knob 3 via an additional coupling 49. For effective kinematics, the damper 45 is disposed in a guide 50 secured to the housing, so that it cannot exert any pitch on the couplings 44 and 49.

Provided on the end of the piston rod 48 projecting into the housing 46 is a disc 48.1, an end of which makes contact with the compression spring 47. The other end of the compression spring 47 makes direct contact with the lower front wall 46.2 of the housing 46. In locked position, the compression spring 47 presses the disc 48.1 of the piston rod 48 to the upper front wall 46.1 of the housing 46. The disc 48.1 and front wall 46.1 together form a stop, which prevents the actuating knob 3 from being driven by the compression spring 47 out of locked position (FIG. 7) and the housing 2.

To unlock the locking mechanism 7, which, except for the above-described variation in the ratchet 9, is substantially the same as the locking mechanisms 7 of the previous embodiments, the actuating knob 3 is pressed into the housing 2, as illustrated in FIG. 8. As a result of this action, the ratchet 9 is pivoted counterclockwise via the transmission lever 39, 40, while the compression spring 47 of the damper 45 is tensioned. This tensioning of the compression spring 47 results from two movements. It results from the action of the actuating knob 3 being pressed down and thereby driving the piston rod 48 into the housing as well as from the pivoting movement of the ratchet 9, whereby the entire damper 45 is shoved upward into guide 50. The shifting of the damper 45 upward is continued by the kinematics of the unlocking process, which are identical with those of the previous embodiments. After the actuating knob 3 is released, the compression spring 47 of the damper 45 can be relaxed, causing the piston rod 48 to be shifted out of the housing 46. This movement is transmitted via the coupling 49 and exerted on the actuating knob 3, causing it to extend out of housing 3 and into its signaling position. The signaling position of the actuating knob 3 results from the striking of the disc 48.1 on the upper front face 46.1 of the housing 46 of the damper 45 (FIG. 9).

The locked position as illustrated in FIG. 7 is achieved by folding the backrest into its upright position, wherein the lug 13 mounted fixedly to the chassis is hooked by the crook 12 of the rotary latch 8.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. Device to indicate when a movable backrest of a vehicle seat is in an unlocked position, comprising:
   a) a housing;
   b) an actuating knob guided axially in the housing, and the actuating knob being pushed into a locked position by a compression spring;
   c) a stop being provided and configured to prevent the actuating knob from extending further than a predetermined amount out of the housing;
   d) the actuating knob being configured to activate a locking mechanism via a transmission mechanism, thereby causing a backrest of a vehicle seat to be unlocked by pressing the actuating knob into the housing;
   e) the stop being displaced axially in the biasing direction of the compression spring during the unlocking process, so that the actuating knob is pressed by the compression spring against the stop into an unlocked signaling position, in which the actuating knob, and hence an unlocked condition signaling portion of the actuating knob, projects substantially further out of the housing than the unlocked condition signaling portion does in a locked position of the actuating knob;
   f) the transmission mechanism including a rocker, which is mounted on an axis mounted fixedly to the housing and which can be pivoted in the biasing direction of the actuating knob;
   g) one end of the rocker being connected via a swivel joint to a transmission lever connected to the locking mechanism, and including the stop; and
   h) at another end of the rocker an actuating stop disposed at a lower surface of the actuating knob being provided, so that when the actuating knob is pressed into the housing the rocker is pivoted as a result of the displacement of the stop in a direction of force of the compression spring, whereby the displacement of the stop
   presses the actuating knob against a thus displaced stop and into a signaling position.

2. Device as claimed in claim 1, wherein:
   a) a further stop is provided;
   b) the transmission mechanism includes a cable loop routed around a stud mounted fixedly in the housing, and ends of which are linked to the locking mechanism;

c) the cable loop includes two branches, and a branch of the cable loop is suspended in the actuating knob as the stop, and the two branches are essentially taut when the actuating knob is in a locked position and are displaced axially in a biasing direction of the compression spring during an unlocking process, so that the spring presses the actuating knob into its signaling position against a further stop.

3. Device as claimed in claim 1, wherein:

a) the actuating knob is connected with the transmission mechanism, and the actuating knob is connected via a damper to the locking mechanism so that in a relaxed state the damper retains the actuating knob in its locked position, is tensioned through the pressing of the actuating knob into the housing and the unlocking process, and is simultaneously displaced in the direction of the actuating knob and moves the actuating knob into a signaling position when relaxed.

4. Device as claimed in claim 3, wherein:

a) the damper includes a damper housing with a compression spring and piston rod therein, one end of the compression spring abuts a lower front side of the damper housing, and another end of the compression spring abuts a disc connected to the piston rod, and the disc is provided at an upper front end of the housing constituting the stop when the damper is relaxed.

5. Device to indicate when a movable backrest of a vehicle seat is in an unlocked position, comprising:

a) a housing;

b) an actuating knob guided axially in the housing, and the actuating knob being pushed into a locked position by a compression spring;

c) a stop being provided and configured to prevent the actuating knob from extending further than a predetermined amount out of the housing;

d) the actuating knob being configured to activate a locking mechanism via a transmission mechanism, thereby causing a backrest of a vehicle seat to be unlocked by pressing the actuating knob into the housing;

e) the stop being displaced axially in the biasing direction of the compression spring during the unlocking process, so that the actuating knob is pressed by the compression spring against the stop into an unlocked signaling position, in which the actuating knob, and hence an unlocked condition signaling portion of the actuating knob, projects substantially further out of the housing than the unlocked condition signaling portion does in a locked position of the actuating knob;

f) a further stop being provided;

g) the transmission mechanism including a cable loop routed around a stud mounted fixedly in the housing, and ends of which are linked to the locking mechanism; and h) the cable loop including two branches, and a branch of the cable loop is suspended in the actuating knob as the stop, and the two branches are essentially taut when the actuating knob is in a locked position and are displaced axially in a biasing direction of the compression spring during an unlocking process, so that the spring presses the actuating knob into its signaling position against a further stop.

6. Device to indicate when a movable backrest of a vehicle seat is in an unlocked position, comprising:

a) a housing;

b) an actuating knob guided axially in the housing, and the actuating knob being pushed into a locked position by a compression spring;

c) a stop being provided and configured to prevent the actuating knob from extending further than a predetermined amount out of the housing;

d) the actuating knob being configured to activate a locking mechanism via a transmission mechanism, thereby causing a backrest of a vehicle seat to be unlocked by pressing the actuating knob into the housing;

e) the stop being displaced axially in the biasing direction of the compression spring during the unlocking process, so that the actuating knob is pressed by the compression spring against the stop into an unlocked signaling position, in which the actuating knob, and hence an unlocked condition signaling portion of the actuating knob, projects substantially further out of the housing than the unlocked condition signaling portion does in a locked position of the actuating knob; and f) the actuating knob being connected with the transmission mechanism, and the actuating knob is connected via a damper to the locking mechanism so that in a relaxed state the damper retains the actuating knob in its locked position, is tensioned through the pressing of the actuating knob into the housing and the unlocking process, and is simultaneously displaced in the direction of the actuating knob and moves the actuating knob into a signaling position when relaxed.

7. Device as claimed in claim 6, wherein:

a) the damper includes a damper housing with a compression spring and piston rod therein, one end of the compression spring abuts a lower front side of the damper housing, and another end of the compression spring abuts a disc connected to the piston rod, and the disc is provided at an upper front end of the housing constituting the stop when the damper is relaxed.

8. Device as claimed in claim 6, wherein:

a) the transmission mechanism includes a rocker, which is mounted on an axis mounted fixedly to the housing and which can be pivoted in the biasing direction of the actuating knob;

b) one end of the rocker is connected via a swivel joint to a transmission lever connected to the locking mechanism, and including the stop; and c) at another end of the rocker an actuating stop disposed at a lower surface of the actuating knob is provided, so that when the actuating knob is pressed into the housing the rocker is pivoted as a result of the displacement of the stop in a direction of force of the compression spring, whereby the displacement of the stop presses the actuating knob against a thus displaced stop and into a signaling position.

9. Device to indicate when a movable backrest of a vehicle seat is in an unlocked position, comprising:

a) a housing;

b) an actuating knob guided axially in the housing, and the actuating knob being pushed into a locked position by a compression spring;

c) a stop being provided and configured to prevent the actuating knob from, extending further than a predetermined amount out of the housing;

d) the actuating knob being configured to activate a locking mechanism via a transmission mechanism, thereby causing a backrest of a vehicle seat to be unlocked by pressing the actuating knob into the housing;

e) the stop being displaced axially in the biasing direction of the compression spring during the unlocking process, so that the actuating knob is pressed by the compression spring against the stop into an unlocked signaling position, in which the actuating knob, and hence
an unlocked condition signaling portion of the actuating knob, projects substantially further out of the housing than the unlocked condition signaling portion does in a locked position of the actuating knob;

f) the actuating knob being connected via a damper to the locking mechanism, so that in a relaxed state the damper retains the actuating knob in its locked position; and g) the damper including a damper housing with a compression spring and piston rod therein, one end of the compression spring abuts a lower front side of the damper housing, and another end of the compression spring abuts a disc connected to the piston rod, and the disc is provided at an upper front end of the housing constituting the stop when the damper in its relaxed state.

10. Device as claimed in claim 9, wherein:

a) the transmission mechanism includes a rocker, which is mounted on an axis mounted fixedly to the housing and which can be pivoted in the biasing direction of the actuating knob;

b) one end of the rocker is connected via a swivel joint to a transmission lever connected to the locking mechanism, and includes the stop; and c) at another end of the rocker an actuating stop disposed at a lower surface of the actuating knob is provided, so that when the actuating knob is pressed into the housing the rocker is pivoted as a result of the displacement of the stop in a direction of force of the compression spring, whereby the displacement of the stop presses the actuating knob against a thus displaced stop and into a signaling position.

* * * * *